Aug. 29, 1967          R. JAMES          3,338,137
                    PISTON POWER UNITS

Filed July 26, 1965                    11 Sheets-Sheet 1

INVENTOR
RICHARD JAMES
BY
Fetherstonhaugh & Co.
ATTORNEYS

Aug. 29, 1967 R. JAMES 3,338,137
PISTON POWER UNITS
Filed July 26, 1965 11 Sheets-Sheet 8

Fig.12.

INVENTOR
RICHARD JAMES
By
Fetherstonhaugh & Co.
ATTORNEYS

Aug. 29, 1967  R. JAMES  3,338,137
PISTON POWER UNITS

Filed July 26, 1965  11 Sheets-Sheet 10

INVENTOR
RICHARD JAMES
By
Fetherstonhaugh
ATTORNEYS

Fig. 18.

United States Patent Office 3,338,137
Patented Aug. 29, 1967

3,338,137
PISTON POWER UNITS
Richard James, Vancouver, British Columbia, Canada, assignor to Richard James Cylindrical Motors Ltd., Vancouver, British Columbia, Canada
Filed July 26, 1965, Ser. No. 474,916
15 Claims. (Cl. 91—223)

ABSTRACT OF THE DISCLOSURE

A piston power unit primarily for use as an internal combustion engine having opposed pistons in a cylinder connected to a crankshaft so that an exhaust port and an intake port at opposite ends of the cylinder and normally closed by the pistons are respectively uncovered or opened in succession, and are covered or closed at substantially the same time.

---

This invention relates to power units of the piston type.

Although the present piston power unit is primarily designed to function as an internal combustion engine, and is mainly so described herein, it can also be made to function as a fluid motor or as a pump. The preferred form of the invention includes two opposed pistons which simultaneously move towards and away from each other, but the unit can be arranged so that one piston moves towards top dead centre as the other piston moves away therefrom, and the unit can be designed with one piston only, the latter arrangement having some advantages over a standard single piston engine.

An object of the present invention is the provision of power units having one or more pistons connected to a crankshaft wherein there is no side thrust of the piston or pistons during reciprocation thereof on the cylinder walls, thereby reducing wear and loss of power relative to standard reciprocating piston power units.

Another object is the provision of a power unit having one or more pistons in which there is relatively large piston displacement for the size of the unit, said unit being such that a relatively small increase in the size of the unit results in a comparatively large increase in piston replacement.

A further object is the provision of a power unit having opposed pistons with connecting rods extending directly therefrom to a single crankshaft. In most of the opposed piston motors of the prior art, the pistons are connected to separate crankshafts with the resulting increase in the number of working parts and the necessity of gearing or the like in order to apply the power to a single take-off. Any prior art opposed motor having only one crankshaft has to employ a complicated link system between the pistons and said crankshaft.

A further object is the provision of a power unit having two opposed pistons connected to a single crankshaft in such a way that the pistons can be made to travel at different speeds relative to each other during different parts of the power strokes thereof so that an exhaust port can be opened before an intake port, and the exhaust port can be closed at the same time as of before the intake port. This prevents loss of fuel-air mixture or, in fuel injected compression ignition engines, prevents loss of scavenging air.

The present power unit is a basic unit including one or two pistons, each unit having a cylinder in which the one or two pistons operate. The invention is such that the unit lends itself to two or more units in line relative to a single crankshaft, or one or more pairs of opposed units located on opposite sides of a single crankshaft.

The present piston power unit in its simplest form comprises a cylinder curved longitudinally about a centre, a piston slidably fitting in the cylinder, means constraining the piston to move about said centre when the piston reciprocates in the cylinder, a crankshaft, and connecting means connected to the piston and to the crankshaft to cause the latter to rotate during reciprocation of the piston. This connecting means is preferably in the form of a connecting rod swingably connected at one end to the piston and at the opposite end to a crank of the crankshaft. The constraining means prevents any side thrust of the piston on the cylinder walls. The unit is mainly built around said centre, and a small increase in diameter of the unit results in a substantial increase in the displacement in the cylinder since the diameter of the latter is increased.

A prefered form of piston power unit comprises a cylinder curved longitudinally about a centre, a pair of opposed pistons slidably fitting in the cylinder for movement towards and away from each other, means constraining the pistons to move about said centre when the pistons reciprocate in the cylinder, a crankshaft, and connecting means connected to each piston and the crankshaft to cause the latter to rotate during said reciprocation of the pistons. As the pistons move towards and away from each other, the displacement in the cylinder is relatively great. This unit has all of the advantages pointed out above in connection with the single piston unit, but is a vast improvement over the latter. The crankshaft is usually equally spaced from the pistons, and this results in a very compact unit for the amount of power developed. A slight increase in diameter of the unit results in a comparatively large increase in the piston displacement.

Although this unit may be used as a fluid motor or a pump, it is mainly designed to be used as an internal combustion engine. In this case, intake and exhaust ports are provided for the cylinder, each of these ports being normally closed by one of the pistons. The ports are located so that as one piston nears the end of its power stroke or its bottom dead centre, the exhaust port is opened, and when the other piston nears its bottom dead centre, the intake port is opened. Each piston is connected to a throw or crank of the crankshaft. An advantage of this power unit is that the various working elements thereof can be so arranged that the pistons move at different speeds relative to each other through different parts of their strokes. This makes it possible to open the exhaust port before opening the intake port, and to close the exhaust port either at the same time as or ahead of the closing of the intake port.

The present power unit is primarily designed to function as a two cycle engine, although it can be operated as a four cycle engine. Furthermore, base compression can be used to supply a fuel mixture to the cylinder, or a fuel-air mixture can be supplied by a blower or supercharger, or fuel and air can be independently injected into the cylinder. In other words, the combustion mixture can be supplied to the cylinder in any desired manner.

If desired, a head may be placed in the cylinder between the two pistons. In this case, the pistons can move towards and away from each other and the head in the manner described above, or one can be moving towards the head and the other away therefrom if desired. In this case, each piston is actually operating in a cylinder section of its own, and it is necessary to provide intake and exhaust ports for each cylinder section.

Examples of the present invention are illustrated in the accompany drawings, in which.

3

Referring to FIGURES 1 to 7 of the drawings, 10 is a piston power unit in the form of an internal combustion engine. This unit is generally circular in form and has a casing 15 made up of an annular wall 16 and side walls 17 and 18, either or both of which are removably connected to the annular wall. Wall 16 is formed with a circular inner surface 20 which curves around a fulcrum shaft 23 located centrally and extending transversely of casing 15. The ends of shaft 23 are removably supported by walls 17 and 18.

A curved inner wall 26 is spaced inwardly from the inner surface 20 of casing wall 16 and is concentric therewith and with shaft 23, said inner wall, inner surface 20 of wall 16 and side walls 17 and 18 forming a cylinder 29 which is curved longitudinally around the centre or longitudinal axis of shaft 23. In this example, cylinder 29 is rectangular in cross section, see FIGURE 2, but it is to be understood that casing 15 and inner wall 26 may be shaped so that cylinder 29 has any desired cross sectional shape, such as round, oval or the like.

If desired, wall 16 and either or both of side walls 17 and 18 of casing 15 may be hollow to form one or more coolant chambers 32. A cooling fluid, such as water, is circulated through chamber or chambers 32 in any convenient manner, not shown. If desired, the engine can be air cooled, in which case, fins would be provided on the outer surface of the casing.

Figure 1:
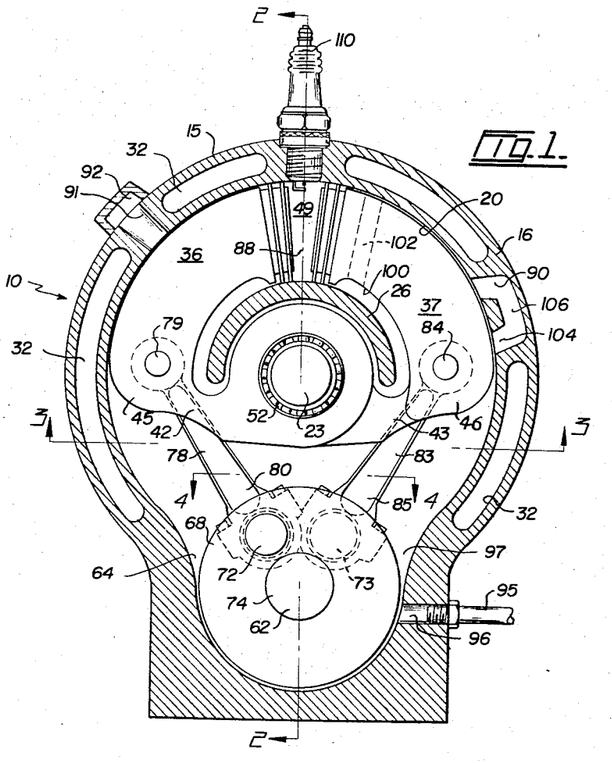
FIGURE 1 is a side elevation of a preferred form of piston power unit with the near cover removed and parts of the unit in section.
Figure 2:
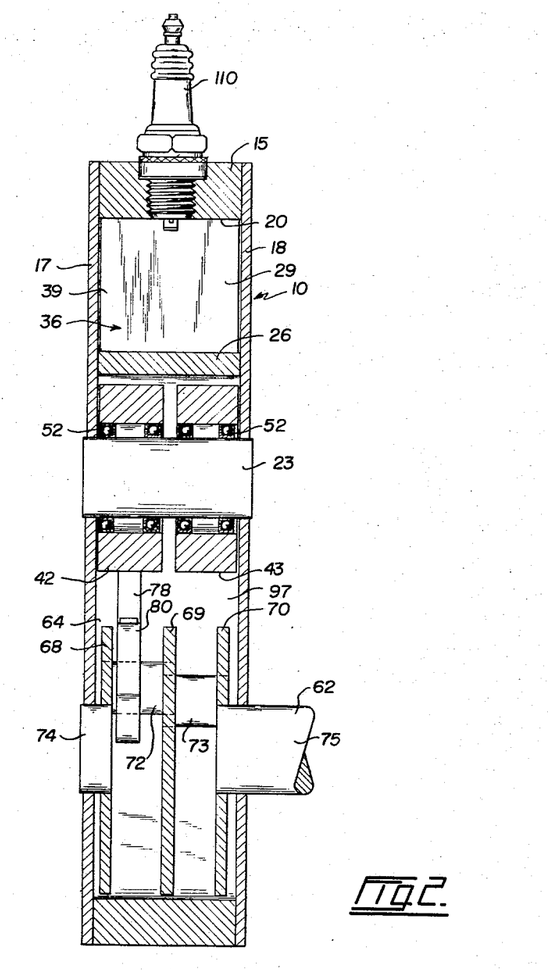
FIGURE 2 is a section taken on the line 2—2 of FIGURE 1.
Figures 3, 4:
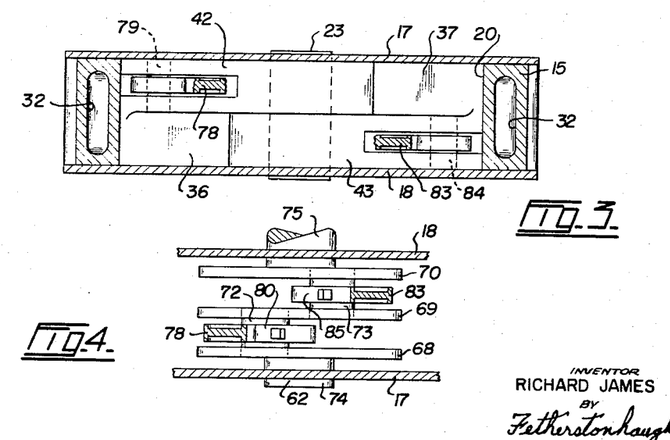
FIGURE 3 is a section taken on the line 3—3 of FIGURE 1.
FIGURE 4 is a section taken on the line 4—4 of FIGURE 1.
Figure 5:
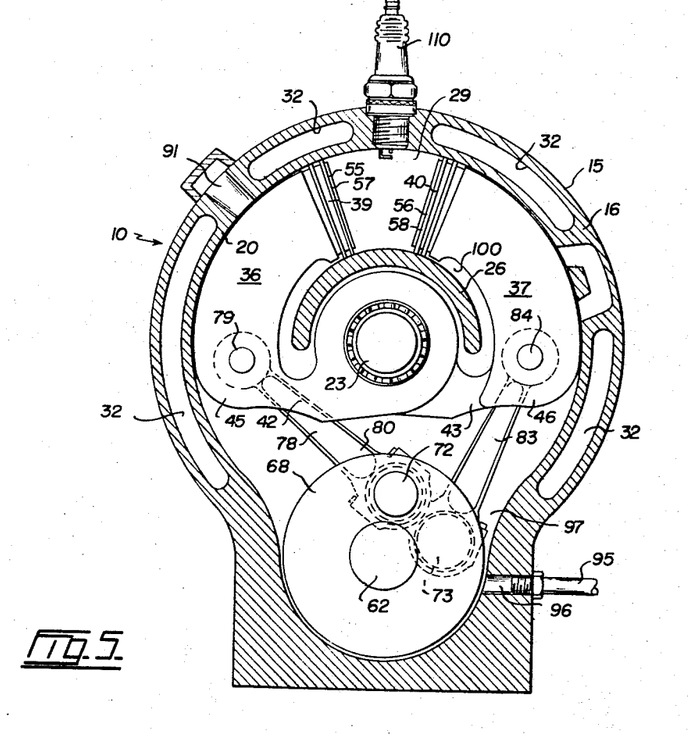
FIGURES 5, 6 and 7 are diagrams illustrating the action of the pistons of the unit of FIGURE 1.
Figure 6:
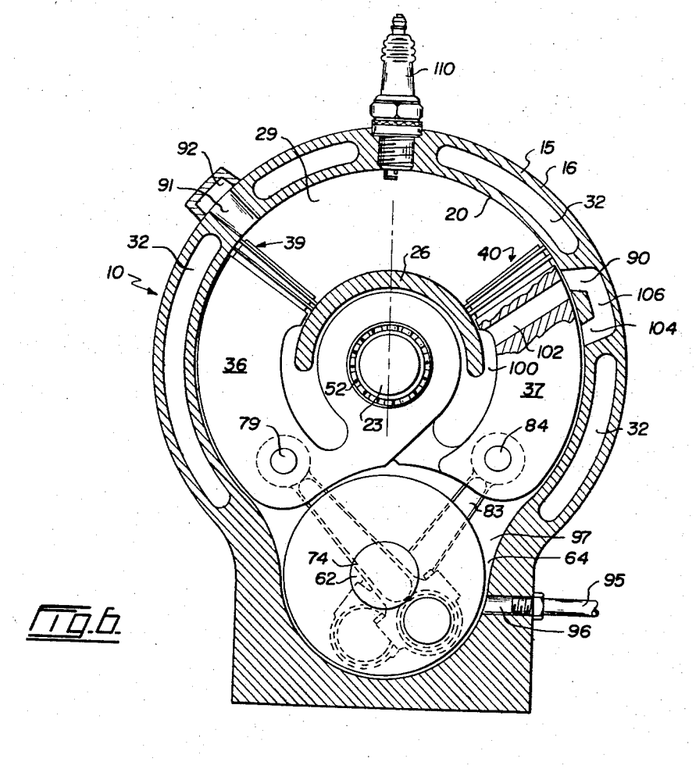
Figure 7:
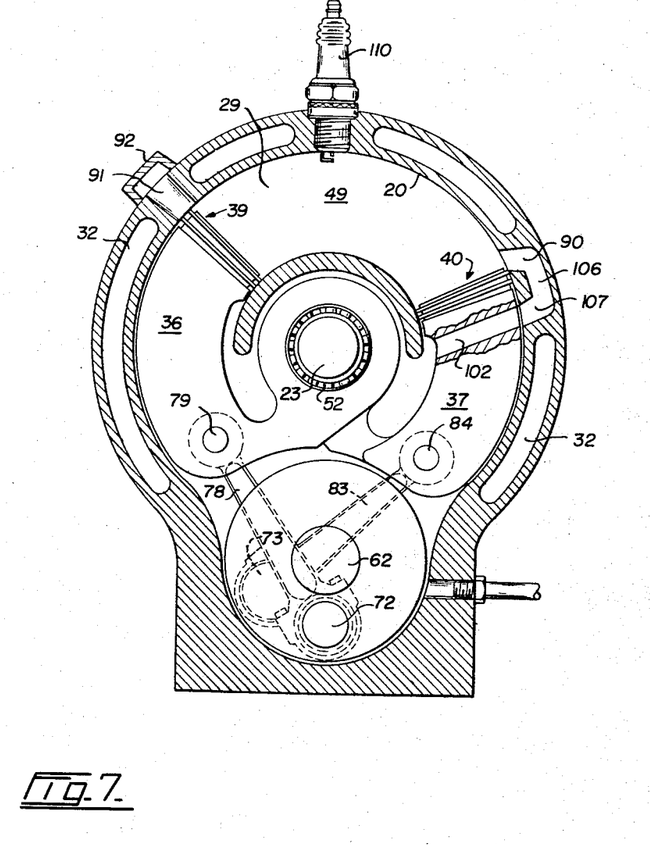

Opposed longitudinally curved pistons 36 and 37 of the same cross sectional shape as cylinder 29 are slidably mounted in said cylinder for movement towards and away from each other. Pistons 36 and 37 have heads 39 and 40 at adjacent ends thereof and facing each other. Arms 42 and 43 are fixedly secured to pistons 36 and 37 at outer or lower ends 45 and 46 thereof. These ends project beyond the ends of inner wall 26 when pistons 36 and 37 are at their inner or top dead centre positions, at which time piston heads 39 and 40 are spaced a little from each other to form a firing chamber 49 in cylinder 29. Outer ends of arms 42 and 43 are mounted on shaft 23 and a suitable non-friction bearing 52 is provided for each arm.

Pistons 36 and 37 are adapted to reciprocate in cylinder 29, and as said cylinder is concentric with shaft 23, said pistons reciprocate around the longitudinal centre or axis of this shaft. As arms 42 and 43 are fixedly secured to pistons 36 and 37 and are rotatably connected to shaft 23, these arms constrain the pistons to move along circular paths about said shaft centre so that there is no side thrust against the walls of the cylinder. Pistons 36 and 37 are provided with one or more suitable piston rings 55 and 56 adjacent their respective heads 39 and 40. If the pistons are circular in cross section, each of the rings 55 and 56 may be in the form of a continuous band, but when the pistons are rectangular in cross section, as shown, rings 55 and 56 are made up of a plurality of bars 57 and 58, respectively, each fitting in a groove in a surface of the piston and projecting slightly outwardly from said groove. If desired, suitable springs may urge the bars 57 and 58 outwardly relative to their respective grooves so that the bars ride along the surfaces of cylinder 29.

A crankshaft 62 is provided for unit 10. This crankshaft is located near fulcrum shaft 23 and is equally spaced from pistons 36 and 37. If desired, crankshaft 62 may fit completely within circular casing 15, but for the sake of compactness and a reduction in weight of unit 10, the crankshaft is partially located in an offset section 64 of casing 15. Although 62 may be a standard crankshaft, it is preferable to use a crankshaft made up of equally spaced discs 68, 69 and 70 interconnected by crank pins 72 and 73 extending respectively between discs 68–69 and 69–70 adjacent the peripheries of said discs. Aligned stub shafts 74 and 75 project outwardly from discs 68 and 70 centrally thereof. By referring to FIGURE 1, it will be seen that pins 72 and 73 are relatively close to each other so that the cranks or throws of crankshaft 62 are close to each other.

A connecting rod 78 has one end swingably connected by a wrist pin 79 to piston 36 adjacent end 45 thereof and an opposite or big end 80 swingably connected to pin 72, said big end 80 fitting between crank discs 68 and 69. Similarly, a connecting rod 83 has one end swingably connected by a wrist pin 84 to piston 37 adjacent end 46 thereof and an opposite or big end 85 connected to pin 73, said end 85 fitting between crank discs 69 and 70.

When the centre of rotation of crankshaft 62, pin 72 and wrist pin 79 of connecting rod 78 are aligned, piston 36 is at its top dead centre, see FIGURE 1. Similarly, piston 37 is at its top dead centre when the centre of the crankshaft, pin 73 and wrist pin 84 of connecting rod 83 are aligned. The alignments of connecting rods 78 and 83 are angularly arranged relative to each other and each alignment is angularly arranged relative to the centre of curvature of cylinder 29, said centre of curvature coinciding with the longitudinal centre of shaft 23. The longitudinal axis of shaft 23, the wrist pin of each connecting rod and the axis of rotation of crankshaft 62 are disposed in triangular relationship, at all times.

When pistons 36 and 37 are at their top dead centre, heads 39 and 40 of these pistons are positioned on opposite sides of a vertical centre line 88 which extends through the centres of shaft 23 and crankshaft 62. Cylinder 29 is provided with intake and exhaust ports 90 and 91 in wall 16 thereof substantially equally spaced on opposite sides of centre line 88. Port 91 communicates with an exhaust duct 92. A combustion mixture is supplied to intake port 90 in any desired manner. In this example, base compression is used to supply an air-fuel mixture. The combustion mixture from a carburetor, not shown, is directed by a pipe 95 through an opening 96 in casing 15 into the base 97 of the unit where crankshaft 62 is located. When pistons 36 and 37 move towards their bottom dead centres, fuel in base 97 is forced along a groove 100 in the side of piston 37 through a transverse passage 102 through said piston and into a transfer port 104 formed in wall 16 when said passage registers with said transfer port. Port 104 is connected to intake port 90 by a transfer passage 106 so that the compressed fuel is forced along passage 106 and through intake port 90 into cylinder 29 between pistons 36 and 37. When the pistons move in the opposite direction, ports 90 and 91 are closed, and the fuel in the cylinder is compressed until the pistons reach their top dead centres. As the pistons approach said top dead centres, the compressed fuel is fired in any convenient manner, such as by means of a spark plug 110 which is threaded into wall 16 and is adapted to create a spark in firing chamber 49 at the appropriate time.

FIGURES 1, 5, 6 and 7 illustrate the positions of the pistons and their associated elements through firing and compression strokes of the pistons. In FIGURE 1, the pistons are at their top dead centres, while in FIGURE 5, the pistons have moved away therefrom. The arrangement of crank pins 72 and 73 relative to each other and to crankshaft 62 is such that piston 36 starts to uncover exhaust port 91 before piston 37 starts to uncover intake port 90. This permits the exhausting or scavenging operation to start before the intake port is opened. By the time piston 36 reaches its bottom dead centre, shown in FIGURE 6, piston 37 starts to open intake port 90. Compressed fuel from the base is directed into cylinder 29 through port 90, simultaneously filling the cylinder with combustible mixture and assisting in the exhaust of the burnt gases through port 91. By the time piston 37 reaches its bottom dead centre, see FIGURE 7, port 90 is fully opened but port 91 is almost closed. The exhaust port is completely closed before the intake port is completely closed. Thus, the cranks of shaft 62 can be arranged so that the pistons move at different speeds during different parts of their strokes, and as a result, the exhaust ports can be opened ahead of the intake port, and the exhaust port can be closed ahead of or at the same time as the intake port regardless of the fact that the two pistons are connected to the same crankshaft.

As pistons 36 and 37 move away from each other during the power stroke, and each piston acts as a head in the cylinder for the other piston, the displacement of the combined pistons in the cylinder is relatively great. As cylinder 29 is concentric about shaft 23, a relatively large increase in displacement can be achieved by a small increase in diameter of casing 15.

Figure 8:
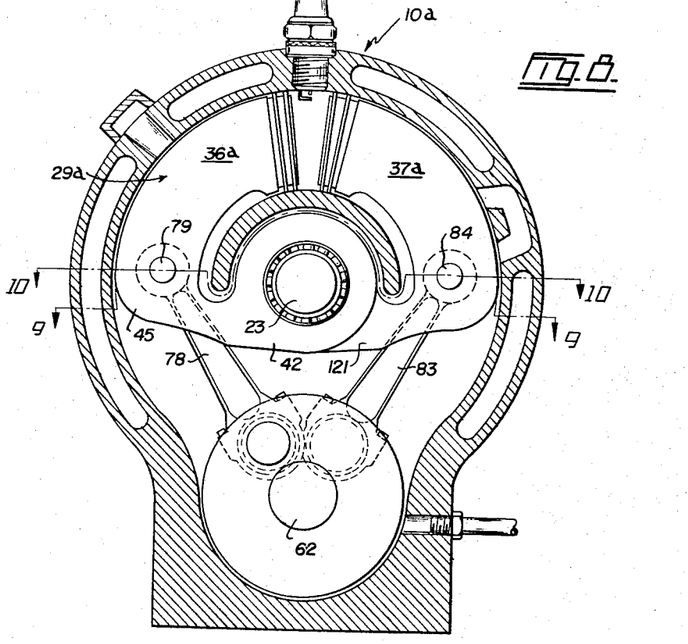
FIGURE 8 is a view similar to FIGURE 1 of an alternative form of power unit.
Figure 9:
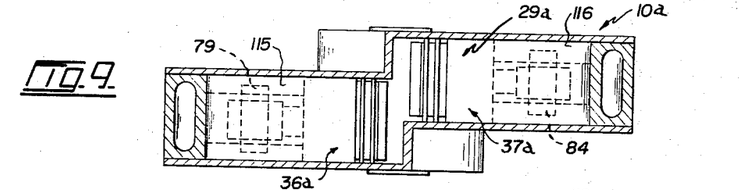
FIGURE 9 is a horizontal section taken on the line 9—9 of FIGURE 8.
Figure 10:
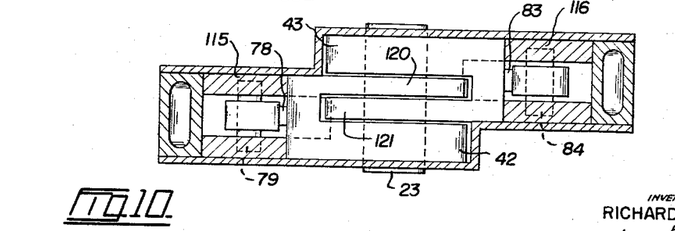
FIGURE 10 is a section taken on the line 10—10 of FIGURE 8.

FIGURES 8 and 9 illustrate an alternative form of piston power unit 10a in which cylinder 29a is formed with laterally offset sections 115 and 116 in which pistons 36a and 37a are slidably mounted. Connecting rods 78 and 83 are connected by wrist pins 79 and 84, respectively, to pistons 36a and 37a centrally thereof, that is, substantially midway between the sides thereof, as clearly shown in FIGURE 9. With this arrangement, the power of the two pistons is applied to their respective connecting rods evenly due to the fact that the connecting rods are centrally located in a transverse direction relative to the pistons. This is possible because of the fact that pistons 36a and 37a are offset laterally relative to each other as a result of the offset of cylinder sections 115 and 116. Arm 42 is connected to end 45 of piston 36a at one side of the latter. In order to avoid a lateral twisting action on the piston because of this arrangement, in this alternative, a second arm 120 similar to arm 42 is fixedly connected to piston end 45 at the opposite side of the piston from arm 42, see FIGURE 10. Similarly, piston 37a is provided with a second arm 121 fixedly connected to the end 46 of the piston at the opposite side of the latter from arm 43. Arms 42–120 and 43–121 balance the force applied by pistons 36a and 37a to shaft 23.

FIGURES 11 to 14 illustrate another alternative power unit 10b. In this unit, piston 36b has arm 42 connected to end 45 at one side thereof, and another similar arm 126 connected to said end at the opposite side of the piston from arm 42, see FIGURE 13. Connecting arm 126 extends to and is rotatably mounted on shaft 23. Piston 37b has a single connecting arm 128 fixedly secured thereto at end 46 centrally thereof, the opposite end of arm 128 being rotatably mounted on shaft 23 between connecting arms 42 and 126 of piston 36b.

Figure 11:
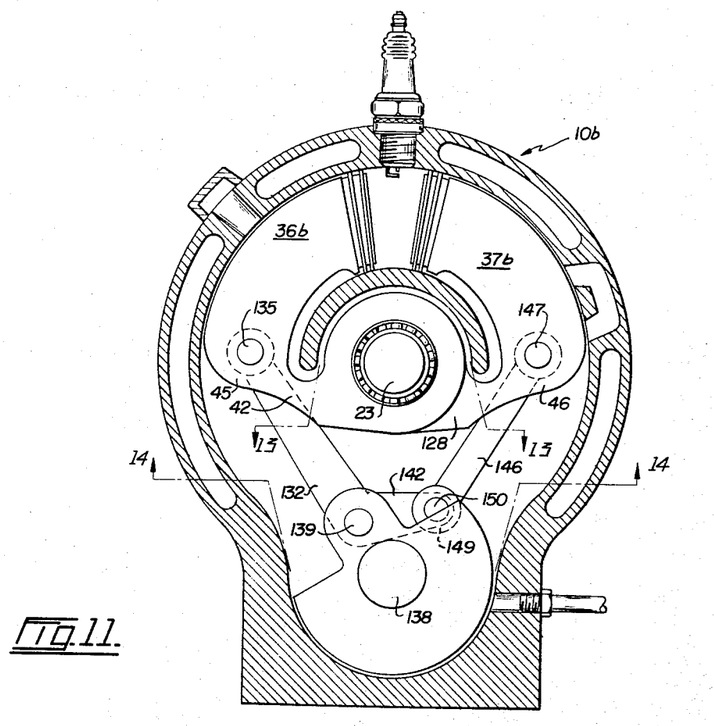
FIGURE 11 is a view similar to FIGURE 1 of another alternative form of power unit, showing the piston at top dead centre.
Figure 12:
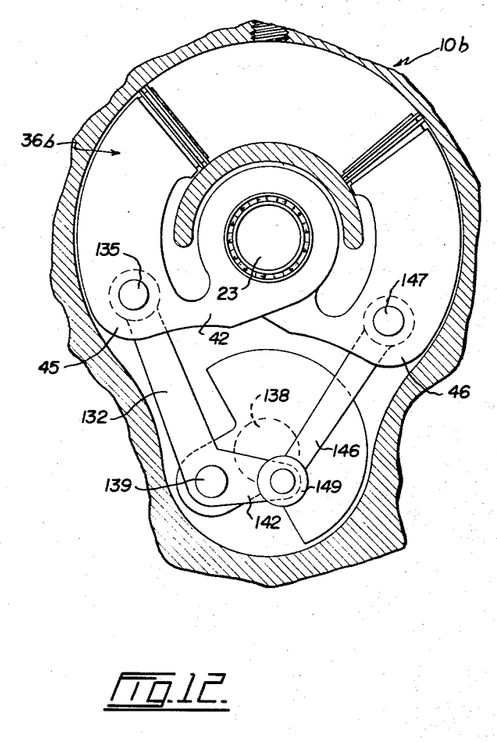
FIGURE 12 is similar to FIGURE 11, showing pistons part way down their strokes.
Figure 13:
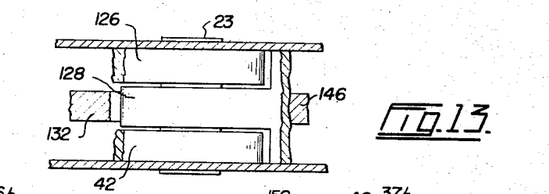
FIGURE 13 is a section taken on the line 13—13 of FIGURE 11.

A connecting rod 132 has one end swingably connected to end 45 of piston 36b by a wrist pin 135. Unit 10b has, instead of crankshaft 62, a crankshaft 138 having a single crank pin 139, to which the lower end of connecting rod 132 is rotatably connected. A connecting arm 142 is fixedly connected to the lower end of rod 132 and projects laterally therefrom. A connecting rod 146 is swingably connected at its upper end to end 46 of piston 37b by a wrist pin 147. Rod 146 is provided with a bifurcated lower end 149 which spans the outer end of arm 142 and is swingably connected thereto by a pin 150.

Figure 14:
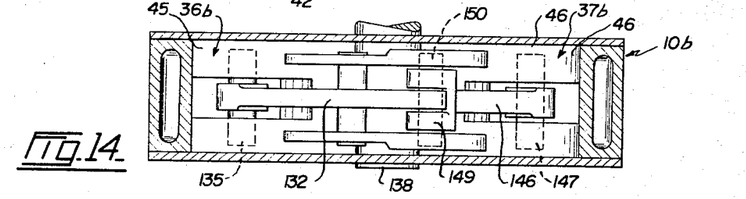
FIGURE 14 is a section taken on the line 14—14 of FIGURE 11.

By referring to FIGURE 14, it will be seen that connecting rods 132 and 146 are in the same plane, and are connected to pistons 36b and 37b substantially midway between the sides thereof. Power unit 10b has advantages over unit 10a resulting from the fact that pistons 36b and 37b are directly opposed to each other, the thrust of said pistons are evenly applied to shaft 23 by arms 42–126 and 128, and connecting rods 132 and 146 are connected to their respective pistons midway between the sides thereof.

Figure 15:
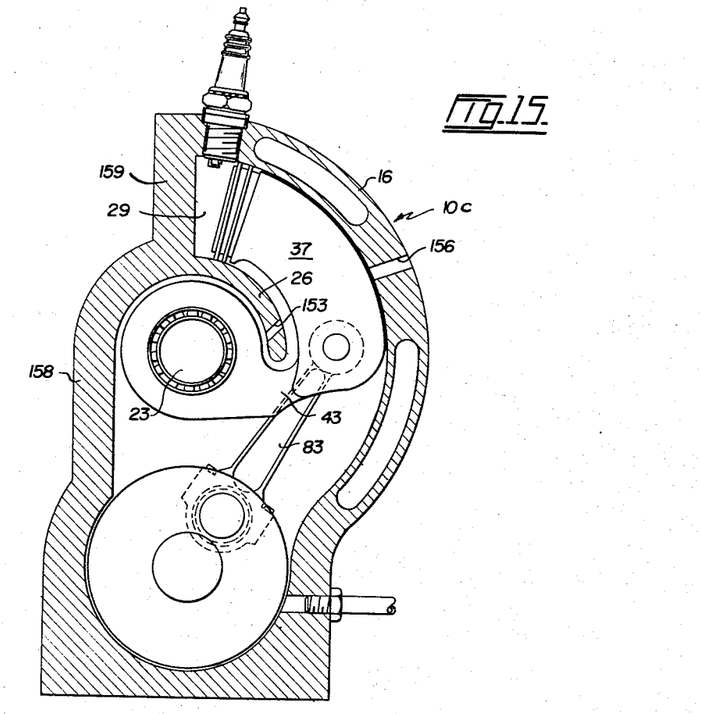
FIGURE 15 is a view similar to FIGURE 1 of a single piston power unit.

FIGURE 15 illustrates a very simple form of piston power unit 10c that has some but not all of the advantages of the above-described units. Unit 10c has one piston only, namely piston 37, and its arm 43 and connecting rod 83. This unit has an intake port 153 in inner wall 26 and an exhaust port 156 extending through wall 16 substantially opposite port 153. The intake port is in communication with the base of the engine. As piston 36 is not present, a wall 158 is provided in order to enclose the interior elements of the unit, said wall providing a head 159 in cylinder 29 opposed to piston 37.

Power unit 10c functions as a single piston internal combustion engine, exhaust port 156 being opened by piston 37 towards the end of the power stroke of the latter just before intake port 153 is opened. Arm 43 and shaft 23 prevent any lateral thrust of the piston against the walls of the cylinder, and a relatively great increase in the displacement of the piston can be attained by a small increase in the diameter from shaft 23 of the unit.

Figure 16:
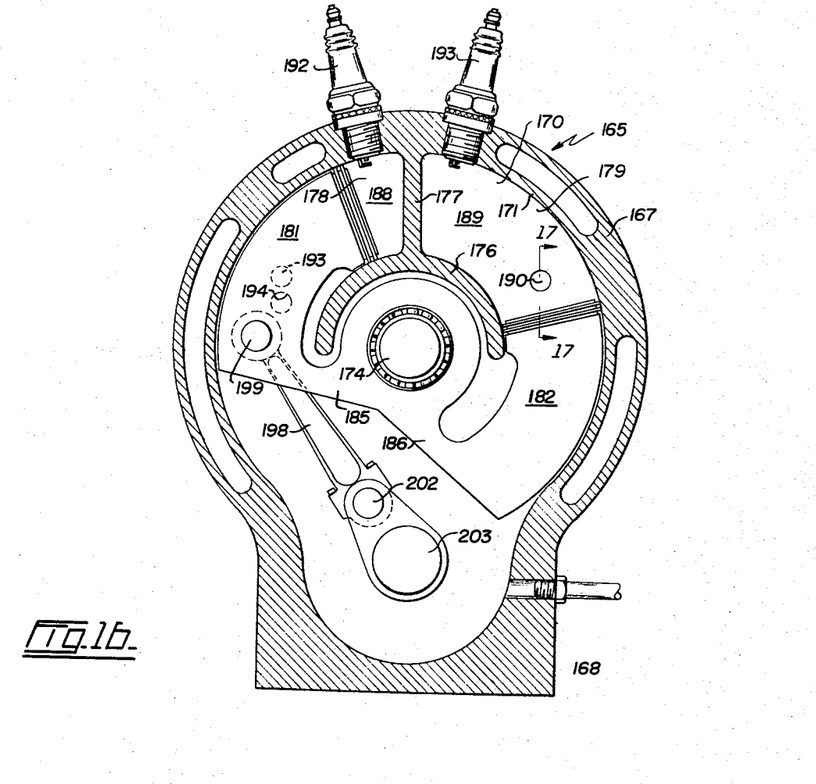
FIGURE 16 is a view similar to FIGURE 1 of yet another alternative form of power unit.
Figure 17:
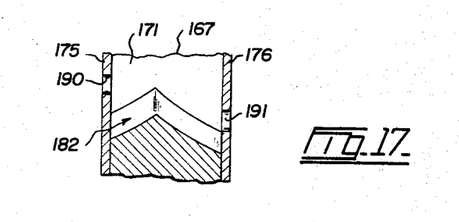
FIGURE 17 is a section on line 17—17 of FIGURE 10.

FIGURES 16 and 17 illustrate an alternative form of piston power unit 165. This unit includes a circular casing 167 having a base 168. A longitudinally curved cylinder 170 is formed in casing 167 by a curved wall 171 concentric with the longitudinal axis of a fulcrum shaft 174. Another wall 176 is concentric with wall 171 and shaft 174 and forms the inner wall of cylinder 170. Side walls 175 and 176 of casing 167 close the sides of cylinder 170. A central head 177 extending between walls 171 and 176 divides cylinder 170 into sections 178 and 179 in which pistons 181 and 182 slidably fit. A connecting arm 185 is rigidly connected to the outer end of piston 181 and extends inwardly therefrom and is rotatably mounted on shaft 174. A similar arm 186 is rigidly connected to the outer end of piston 182 and extends in to and is rotatably mounted on shaft 174. Arms 185 and 186 are preferably rigidly secured to each other with piston 178 at its top dead centre when piston 182 is at its bottom dead centre. When at its top dead centre, piston 181 is spaced from head 177 to form a firing chamber 188 on one side of said head. A similar firing chamber 189 remains in cylinder section 179 when piston 182 is at its top dead centre spaced from the head. Spark plugs 192 and 193 are provided for cylinder sections 178 and 179 adjacent head 177.

Unit 165 is provided with standard 2 cycle engine porting for each of the cylinder sections 178 and 179 for supplying fuel to and scavenging said cylinder sections. FIGURE 17 illustrates intake and exhaust ports 190 and 191 formed in side walls 175 and 176 of the unit. These ports are preferably arranged so that piston 182 uncovers exhaust port 191 a little before it starts to uncover intake port 190, as is customary with two cycle engines. Similar intake and exhaust ports 193 and 194 are provided for cylinder section 178 and piston 181.

Unit 165 has one connecting rod only which may be connected to the outer end of either piston 181 or 182 and, if desired, positioned below the piston to which it is connected. In the illustrated example, a connecting rod 198 is connected to the outer end of piston 181 by a wrist pin 199, the opposite end of said rod being connected to crank pin 202 of a crankshaft 203 spaced below shaft 174.

When power unit 165 is in operation, pistons 181 and 182 reciprocate in opposite directions in cylinder sections 178 and 179 and rotate crankshaft 203 through connecting rod 198. Arms 185 and 186 constrain said pistons to move along a circular path which is concentric with the longitudinal centre of shaft 174.

Figure 18:
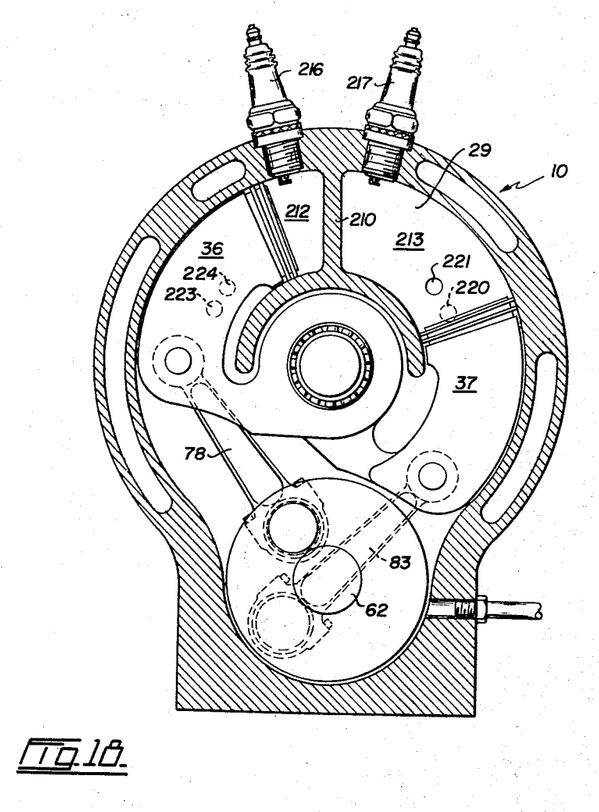
FIGURE 18 is a view similar to FIGURE 1 of a still further alternative form of unit.

FIGURE 18 illustrates another alternative power unit 10d which is similar to unit 10. In this example, pistons 36 and 37 in cylinder 29 and the connection of connecting rods 78 and 83 to crankshaft 62 are such that piston 36 is at its top dead centre when piston 37 is at its bottom dead centre, and vice versa. A head 210 is provided in cylinder 29 dividing it into sections 212 and 213 in which pistons 36 and 37, respectively, reciprocate. Spark plugs 216 and 217 are provided for cylinder sections 212 and 213 on opposite sides of head 210 and near said head. Intake and exhaust ports 220 and 221 similar to ports 190 and 191 of unit 165 are provided in opposite walls 17 and 18 in cylinder section 13 of unit 10d. These ports are arranged so that port 221 is uncovered by piston 37 a little ahead of intake port 220. Similarly, intake and exhaust ports 223 and 224 are provided for cylinder section 212 so that piston 36 uncovers the exhaust port a little ahead of the intake port as said piston approaches its bottom dead centre.

In the two-piston power units, the distance of the wrist pins of the pistons from the centre of rotation of the pistons, the length of the connecting rods, and the angle between the two throws or cranks of the crankshaft determine the amount of displacement of the pistons and the timing of the opening and closing of the intake and exhaust ports. This applies to pistons and cylinders of a predetermined size.

As stated above, this power unit can be designed to act as a fluid motor or a pump. When the unit is functioning as a fluid motor, the pressure fluid would be directed into the cylinder thereof through suitable port means when the piston or pistons are at top dead centre, and would be exhausted through suitable port means when the piston or pistons are at bottom dead centre. If the unit is intended to function as a pump, the crankshaft would be rotated by a desired source of power, and suitable ports and check valves would be provided so that the piston or pistons on down and up strokes thereof would alternately draw liquid into the cylinder and expel it therefrom.

What I claim as my invention is:

1. A piston power unit comprising a cylinder curved longitudinally about a centre, a pair of opposed pistons slidably fitting in the cylinder for movement towards and away from each other, each piston having a head at the end thereof facing the opposed piston, means connected to an opposite end of each piston constraining said piston to move about said centre when the pistons reciprocate in the cylinder, a crankshaft having two circumferentially-spaced cranks, and connecting means for each piston in the form of a connecting rod having a first end swingably connected to the latter piston and a second end connected to one of the cranks of the crankshaft to cause said crankshaft to rotate during reciprocation of the pistons in said cylinder, each connecting rod being connected to a different crank from the other rod.

2. A piston power unit as claimed in claim 1 including means for directing an operating fuel into the cylinder when the pistons near the end of a stroke away from each other, firing means for igniting the fuel in the cylinder when the pistons near the end of a stroke towards each other, and means for scavenging the cylinder as the pistons near said end of the stroke away from each other.

3. A piston power unit as claimed in claim 1 which said centre, the point of connection of each connecting rod to its piston and the axis of rotation of the crankshaft are disposed in triangular relationship.

4. A piston power unit as claimed in claim 1 in which the points of connection of each connecting means to the piston thereof and to its crank of the crankshaft, and the centre of rotation of the crankshaft are substantially aligned when said each piston is at the end of its stroke towards the other of said pistons, and said alignment is angularly arranged relative to said centre of curvature of the cylinder.

5. A piston power unit comprising a fulcrum shaft, a longitudinally curved cylinder spaced from the shaft and concentric therewith, a pair of opposed pistons slidably fitting in the cylinder for movement towards and away from each other, a restraining arm for each piston connected at one end to the fulcrum shaft to swing around the longitudinal axis thereof and fixedly connected at an opposite end to said each piston to constrain the latter piston to move along a circular path when the pistons reciprocate in the cylinder, a crankshaft having two circumferentially-spaced cranks, and connecting means for each piston in the form of a connecting rod having a first end swingably connected to the latter piston and a second end connected to one of the cranks of the crankshaft to cause said crankshaft to rotate during reciprocating of the pistons in said cylinder, such connecting rod being connected to a different crank from the other rod.

6. A piston power unit as claimed in claim 5 including means for directing an operating fuel into the cylinder when the pistons near the end of a stroke away from each other, firing means for igniting the fuel in the cylinder when the pistons near the end of a stroke towards each other, and means for scavenging the cylinder as the pistons near said end of the stroke away from each other.

7. A piston power unit as claimed in claim 5 in which the axial centre of the fulcrum shaft, the point of connection of each connecting rod to its piston and the axis of rotation of the crankshaft are disposed in triangular relationship.

8. A piston power unit as claimed in claim 5 in which the points of connection of each connecting rod to its piston and to its crank of the crankshaft, and the centre of rotation of the crankshaft are substantially aligned when the pistons are at the end of each stroke towards each other, and said alignment is angularly arranged relative to said centre of curvature of the cylinder.

9. A piston power unit comprising a fulcrum shaft, a longitudinally curved cylinder spaced from the shaft and concentric therewith, a pair of opposed pistons slidably fitting in the cylinder for movement towards and away from each other, a restraining arm for each piston connected at one end to the fulcrum shaft to swing around the longitudinal axis thereof and fixedly connected at an opposite end to said each piston to constrain the latter piston to move along a circular path when the pistons reciprocate in the cylinder, a crankshaft having first and second cranks circumferentially spaced from each other, and a connecting rod for each piston having a first end swingably connected to the latter piston and a second end connected to a crank of the crankshaft, the connecting rod of one of said pistons being connected to the first crank and the connecting rod of the other of said pistons being connected to the second crank, whereby reciprocation of the pistons in said cylinder causes the crankshaft to rotate.

10. A piston power unit comprising a cylinder curved longitudinally about a centre, said cylinder having intake and exhaust ports adjacent opposite ends thereof, a pair of opposed pistons slidably fitting in the cylinder for movement towards and away from each other, said pistons normally covering the ports and uncovering said ports when the pistons approach the end of a stroke moving away from each other, said pistons being adapted to compress a charge of fuel as the pistons approach the end of a stroke moving towards each other, firing means for igniting a compressed fuel charge, means constraining the pistons to move about said centre when the pistons reciprocate in the cylinder, a crankshaft, and connecting means connected to each piston and the crankshaft to cause the latter to rotate during said reciprocation of the pistons, said connecting means positioning the pistons in the cylinder so that one piston opens the exhaust port before the other piston opens and the intake port and so that said one piston closes the exhaust port at substantially the same time as said other piston closes the intake port.

11. A piston power unit comprising a cylinder curved longitudinally about a centre, said cylinder having intake and exhaust ports adjacent opposite ends thereof, a pair of opposed pistons slidably fitting in the cylinder for movement towards and away from each other, said pistons normally covering the ports and uncovering said ports when the pistons approach the end of a stroke moving away from each other, said pistons being adapted to compress a charge of fuel as the pistons approach the end of a stroke moving towards each other, firing means for igniting a compressed fuel charge, means constraining the pistons to move about said centre when the pistons reciprocate in the cylinder, a crankshaft having first and second cranks circumferentially spaced from each other, and a connecting rod for each piston having a first end swingably connected to the latter piston and a second end connected to a crank of the crankshaft, the connecting rod of one of said pistons being connected to the first crank and connecting rod of the other of said pistons being connected to the second crank, the spacing of said cranks being such as to position the pistons in the cylinder so that one piston opens the exhaust port before the other piston opens and the intake port and so that said one piston closes the exhaust port at substantially the same time as said other piston closes the intake port.

12. A piston power unit comprising a fulcrum shaft, a longitudinally curved cylinder spaced from the shaft and concentric therewith, a crankshaft positioned on the side of the fulcrum shaft remote from the cylinder, said crankshaft and said fulcrum shaft being located on a centre line passing through the axes thereof, and through the cylinder, a pair of opposed pistons slidably fitting in the cylinder on opposite sides of said centre line for movement towards and away from each other, said cylinder having intake and exhaust ports adjacent opposite ends thereof substantially equally spaced from said centre line, said pistons normally covering the ports and uncovering said ports when the pistons approach the end of a stroke moving away from each other, said pistons being adapted to compress a charge of fuel as the pistons approach the end of a stroke moving towards each other, firing means for igniting a compressed fuel charge, means constraining the pistons to move about said centre when the pistons reciprocate in the cylinder, and connecting means connected to each piston and the crankshaft to cause the latter to rotate during said reciprocation of the pistons, said connecting means positioning the pistons in the cylinder so that one piston opens the exhaust port before the other piston opens the intake port and so that said one piston closes the exhaust port at substantially the same time as said other piston closes the intake port.

13. A piston power unit as claimed in claim 12 in which said crankshaft has first and second cranks circumferentially spaced from each other, and said connecting means comprises a connecting rod for each piston having a first end swingably connected to the latter piston and a second end connected to a crank of the crankshaft, the connecting rod of one of said pistons being connected to the first crank and the connecting rod of the other of said pistons being connected to the second crank, and said cranks being so located relative to each other that when the pistons are at the end of a stroke moving towards each other, the cranks are near but on opposite sides of said centre line and substantially equally spaced therefrom.

14. A piston power unit as claimed in claim 12 including a transfer port adjacent the intake port and connected thereto by a passage, said transfer port opening into the cylinder and being covered by the piston normally covering the intake port, and a passage in the latter piston positioned to register with the transfer port when said latter piston is near the end of its stroke away from said opposed piston thereby to bring said transfer port into communication with a supply of said fuel.

15. A piston power unit as claimed in claim 14 in which said passage in said latter piston is in communication with a base for said power unit in which said crankshaft is located and which is in communication with the ends of the curved cylinder.

References Cited

UNITED STATES PATENTS

| | | | |
|---|---|---|---|
| 374,968 | 12/1887 | Kadel | 123—18 |
| 829,231 | 8/1906 | Primat | 123—18 |
| 1,094,794 | 4/1914 | Kemper | 123—18 |
| 1,318,228 | 10/1919 | Pavia et al. | 123—18 |
| 1,335,947 | 4/1920 | Welke | 123—18 |
| 1,831,155 | 11/1931 | Blau et al. | 123—73 |
| 2,186,400 | 1/1940 | Aiken | 123—18 |

FOREIGN PATENTS 772,211  8/1934  France.

MARK NEWMAN, *Primary Examiner.*

WENDELL E. BURNS, *Examiner.*